United States Patent [19]

Visca et al.

[11] Patent Number: 4,623,437
[45] Date of Patent: Nov. 18, 1986

[54] CATALYSTS FOR PHOTO-ASSISTED OXIDATION-REDUCTION REACTIONS

[75] Inventors: Mario Visca, Alessandria; Carlo Scotti, Voghera, both of Italy

[73] Assignee: Sibit S.p.A., Milan, Italy

[21] Appl. No.: 398,338

[22] Filed: Jul. 15, 1982

[30] Foreign Application Priority Data

Jul. 20, 1981 [IT] Italy ........................... 23029 A/81

[51] Int. Cl.⁴ .................. B01J 19/12; B01J 27/14; B01J 27/188; B01J 27/02
[52] U.S. Cl. ..................... 204/157.47; 204/157.49; 204/157.5; 204/157.52; 204/903; 502/208; 502/210; 502/216; 501/134; 501/136
[58] Field of Search ............... 252/437, 439, 520, 521, 252/3-7; 501/134, 136; 204/157.1 W, 157.47

[56] References Cited

U.S. PATENT DOCUMENTS

| | | | |
|---|---|---|---|
| 3,953,375 | 4/1976 | Nogano | 252/520 |
| 4,219,392 | 8/1980 | Halmann | 204/158 R |
| 4,303,486 | 12/1981 | Bard et al. | 204/162 R |
| 4,362,637 | 12/1982 | Molsuo et al. | 252/521 X |
| 4,382,846 | 5/1983 | Gratzel et al. | 204/157.1 W |
| 4,484,992 | 11/1984 | Bühler et al. | 502/223 X |

FOREIGN PATENT DOCUMENTS

| | | | |
|---|---|---|---|
| 0058136 | 8/1982 | European Pat. Off. | 252/439 |
| 55-105625 | 8/1980 | Japan | |

OTHER PUBLICATIONS

"Visible Light Cleaner Hydrogen Sulfide" Chemical and Engineering News, Jul. 27, 1981, p. 40.
Nature, vol. 291, Jun. 4, 1981, pp. 399–401, 1981 Macmillan Journals Ltd.
Photo Dec. of Water by Solar Energy-Hevolution; $CO_2$ Fixation on Powered Semi-Conductors and Their Mech. with Pulsed Layer-Dynamic Mass Technique, Kawai et al., Institute of Molecular Science, Myodaji; Okazahi, 444, Japan.
Borgarello et al. Nature, vol. 289, n. 5794, pp. 158–160, 1981.
Kalyanasundaram et al. Helvetica Chimica Acta, vol. 64, Fasc. 1 (4 Feb. 1981), Nr. 35, pp. 362–366.

Primary Examiner—Andrew H. Metz
Assistant Examiner—William G. Wright
Attorney, Agent, or Firm—Stevens, Davis, Miller & Mosher

[57] ABSTRACT

New catalysts for photo-assisted (i.e. promoted by light) oxidation-reduction (redox) reactions are disclosed. These catalysts consist of colloidal particles of a semiconductor, containing on their surface a reduction catalyst and an oxidation catalyst. In a first class of catalysts, the semiconductor has a difference of energy between valence band and conduction band such as to allow the hole-electron separation by absorption of visible light. This semiconductor is selected, in the case of the photo-decomposition of water, from the group consisting of $TiO_2$ doped with Mn, Cr, or Cr and Nb; CdS doped with In or Ga; $SrTiO_3$ doped with Cr or Mn; gallium phosphide; and cadmium sulphoselenide. In the case of the other photo-decomposition reactions, the semiconductor is selected from the group consisting of the above-mentioned compounds and CdS.

In a second class of catalysts, the semiconductor has a difference of energy between valence band and conduction band such as not to permit the hole-electron separation by absorption of visible light. This semiconductor is selected, in the case of the photo-decomposition of water, from the group consisting of $SrTiO_3$ and $Nb_2O_5$. In the case of the other photo-decompositon reactions, the semiconductor is selected from the group consisting of the above-mentioned compounds and $TiO_2$ doped with Nb.

18 Claims, No Drawings

CATALYSTS FOR PHOTO-ASSISTED OXIDATION-REDUCTION REACTIONS

The present invention relates to new catalysts for photo-assisted oxidation-reduction reactions, i.e. oxidation-reduction reactions capable of taking place by virtue of the energy provided by the photons emitted by a light source, such as sunlight.

The photo-decomposition of water by means of solar energy is already known. It is based on the forming, in an aqueous solution, by radiation of visible light, of activated complexes of a redox system capable of reacting on suitable catalysts to give $H_2$ and $O_2$.

A reaction utilized to such purpose is based on the use, in the presence of colloidal Pt and $RuO_2$ catalysts, of a redox system composed of a ruthenium trisbipyridyl sensitizer and by the methylviologen (N,N'-dimethyldipyridine) electronic relay. More particularly, the system operates as follows: the ruthenium trisbipyridyl in its reduced form $Ru(bipy)_3^{2+}$ reduces the methylviologen $MV^{2+}$ under the action of visible light, wherefore the following is obtained:

(1) the reduced $MV^+$, which reduces water to $H_2$ on the Pt catalyst, regenerating $MV^{2+}$;
(2) the oxidized $Ru(bipy)_3^{3+}$, which oxidizes water to $O_2$ on the $RuO_2$ catalyst, regenerating $Ru(bipy)_3^{2+}$.

The $H_2$ and $O_2$ yields obtained with this system are very low.

An object of the present invention is that of providing new catalysts for the photo-decomposition of water and for other photo-assisted redox reactions, which will ensure high reaction yields.

Another object of the present invention is that of providing new catalysts which permit one to effect the photo-assisted redox reactions either in the absence of the redox system or in the presence of a simplified redox system.

These and still other objects are achieved, according to the present invention, by two types of catalysts for photo-assisted oxidation-reduction (redox) reactions, which fall within the same inventive concept. These catalysts not only promote the already known photo-decomposition of water, but make possible, with the aid of light, other redox reactions, such as, for example:

the photo-decomposition of $H_2S$ to $H_2$ and polysulphide ions,
the photo-reduction of $CO_2$ to organic substances, such as methanol,
the photo-decarboxylation of carboxylic acids, for example the decarboxylation of acetic acid to $CH_4$, $H_2$ and $CO_2$.

Both types of catalysts consist of colloidal particles of a semiconductor containing on their surface a reduction catalyst and an oxidation catalyst. In the former catalyst type, the semiconductor has an energy difference between valence band and conduction band such as to permit the hole-electron separation by absorption of visible light; furthermore, the conduction electron has such a reducing potential and the hole in the valence band has such an oxidizing potential as to allow, in the presence of the aforesaid reduction and oxidation catalysts, the accomplishment of the redox reaction. The semiconductors of the catalysts of the former type are selected, in the case of the photo-decomposition of water, from the group consisting of $TiO_2$ doped with Mn, Cr, or Cr and Nb; CdS doped with In or Ga; $SrTiO_3$ doped with Cr or Mn; gallium phosphide; and cadmium sulphoselenide. In the case of the other photo-decomposition reactions, the semiconductors are selected from the group consisting of the above-mentioned compounds and CdS.

In the latter catalyst type, the semiconductor has an energy difference between valence band and conduction band such as not to permit the hole-electron separation by absorption of visible light. The semiconductor, however, has such a conduction band that, after having received one or more electrons from a sensitizer excited by absorption of visible light, said electron or electrons have a reducing potential such as to promote the reduction semi-reaction in the presence of the reduction catalyst while the oxidized sensitizer (such sensitizer being oxidized in consequence of the yielding of the electron or electrons to the conduction band) promotes the oxidation semi-reaction in the presence of the oxidation catalyst.

The semiconductors of the catalyst of the second type are selected, in the case of the photo-decomposition of water, from the group consisting of $SrTiO_3$ and $Nb_2O_5$. In the case of the other photo-decomposition reactions, the semiconductors are selected from the group consisting of the above-specified compounds and Nb-doped $TiO_2$.

For the sake of brevity, the semiconductors and catalysts of the first type will be hereinafter referred to as colored semiconductors and catalysts inasmuch as the absorption of visible light is generally evidenced by the color of the catalysts, while the semiconductors and catalysts of the second type will be hereinafter referred to as uncolored semiconductors and catalysts inasmuch as, due to the non-absorption of visible light, they appear white in a dispersed form.

The invention will be still better understood on the basis of the following further detailed description.

In a semiconductor compound, the excitation of an electron from the valence band to the conduction band leads to the formation of a hole-electron pair, corresponding to an electron vacancy in the valence band and to an excited electron in the conduction band. The energy required for the electronic excitation can be provided, for example, by absorption of a light quantum; as a function of the difference of energy between the two bands, the electron transfer to the conduction band occurs by absorption of visible or ultraviolet light. In the case of the uncolored semiconductors according to the present invention, this energy can be supplied only by an ultraviolet photon.

The colored semiconductors conforming to this invention exhibit a lesser difference of energy between the bands, this difference being such as to permit the hole-electron separation by absorption of a photon of visible light. The hole-electron separation in the semiconductors brings the system to an excited energetic state: in particular the electron in the conduction band proves to have reducing characteristics, while the electronic vacancy in the valence band is oxidizing. The presence of a reduction catalyst and of an oxidation catalyst makes possible the redox reaction with high yields. It is therefore apparent that the colored catalysts, which are an object of the present invention, promote the redox reaction with the aid of visible light without requiring the presence of a redox system in the aqueous dispersion, i.e. without using a sensitizer and an electronic relay.

Conversely, in the case of the uncolored catalysts, which also are an object of the present invention, the redox reaction, in the absence of a redox system in the aqueous dispersion, occurs only with the aid of ultraviolet light; on the contrary, it occurs with the aid of visible light if a sensitizer is present in the aqueous dispersion. In such case, the sensitizer is brought to a stable excited state by absorption of a visible light quantum. The excited sensitizer transfers one or more of its electrons to the conduction band of the semiconductor. The electron or electrons of the conduction band act as a reducer in the presence of the reduction catalyst, thus promoting the reduction reaction (for example the reduction of $H^+$ to $H_2$ in the case of the photodecomposition of water). In its turn the sensitizer now in the oxidized state, after having yielded the electron or electrons to the semiconductor, promotes the oxidation semireaction in the presence of the oxidation catalyst (for example the oxidation of $H_2O$ to $O_2$ in the case of the photodecomposition of water). The semiconducting properties of the utilized substances may be inherent or induced by a doping agent. The presence of the doping agent may also create color centers in the semiconductor such as to permit electronic excitation in the visible field.

The photodecomposition of $H_2S$ permits one to produce $H_2$ and polysulphide ions starting from a substance which is often a recovery of waste substance and is highly polluting. The photodecomposition of $CO_2$ permits one to transform $CO_2$ into useful organic substances, such as methanol. The photodecomposition of acetic acid is useful to accelerate complex and slow reactions which involve a decarboxylation step, such as for example the production of fuel gas by decomposition of organic wastes.

As reduction catalyst it is possible to employ, for example, platinum, iridium, palladium, rhodium, osmium, silver and gold. Platinum is preferably used.

As oxidation catalyst it is possible to use, for example, oxides of ruthenium, platinum, iridium, manganese, iron, cobalt or tantalum. $RuO_2$ is preferably used.

The size of the semiconductor particles is generally between 50 Å and 10μ. Preferably it is between 100 Å and 2μ. These sizes refer to the particles in dispersion, either as aggregates or in the form of individual particles. The oxidation and reduction catalysts present on the surface of the semiconductor particles must be in a finely divided state.

The amount of reduction catalyst, referred to the semiconductor, is generally between 0.5 and 30% by weight, and preferably between 1 and 15%.

The amount of oxidation catalyst, referred to the semi-conductor, is generally between 0.005% and 10% by weight, and preferably between 0.1 and 2%.

In the case of doped semiconductors, the amount of doping agent, referred to the semiconductor, generally ranges from 0.001 to 10% by weight.

In the course of the photo-assisted redox reactions, the catalyst system consisting of the semiconductor and of the reduction and oxidation catalysts is maintained in the dispersed state, by stirring, in an aqueous solution. If the reaction which is required to occur is a reaction different from the photodecomposition of water, then a reagent, e.g. $CO_2$, $Na_2S$ or a carboxylic acid, is also fed. The reaction is conducted, as required, under radiation of visible light or of ultraviolet light.

Generally the reaction is operated at room temperature; however, one may operate at higher temperatures than room temperature, for example at temperatures ranging from 40° C. to the boiling temperature of the solution.

The pH at which the reaction is operated depends on the nature of the oxidation-reduction reaction and on the nature of the semiconductor; in particular, the reaction is to be conducted at a pH at which: (1) the electron in the conduction band proves to have a potential suitable for conducting the reduction semireaction; and (2) the hole in the valence band or the oxidized sensitizer has a potential suitable for conducting the oxidation semi-reaction. For the photodecomposition of water, the pH may range, for example, from 4 to 5 when $SrTiO_3$ and $TiO_2$ doped with Cr and Nb are used as semiconductors. For the photodecomposition of $H_2S$ and the photoreduction of $CO_2$, the pH may range, for example, from 12 to 14, when CdS is used as a semiconductor. For the photodecomposition of acetic acid, the pH may range, for example, from 2 to 3, when $TiO_2$ doped with Cr and Nb is used as a semiconductor.

The concentration of the semiconductor in the dispersion is generally in the range of from 10 mg/l to 10 g/l, and preferably from 50 mg/l to 1 g/l.

Although the redox reaction can take place with visible light in the presence of the catalyst only, if the catalyst is colored, or in the presence only of the catalyst and of a sensitizer if the catalyst is uncolored, it is possible to use more complex redox systems, i.e. systems containing other redox components, such as sensitizers, electronic relays, and sacrificial substances (i.e. substances which undergo an oxidation semireaction or a reduction semi-reaction and therefore are consumed during the whole redox reaction).

In the case of, for example, of the photodecomposition of water, one may use, with the colored catalysts, the following systems with the aid of visible light:
(1) The catalyst alone, as already mentioned,
(2) the catalyst and a sensitizer,
(3) the catalyst, a sensitizer, and an electronic relay,
(4) the catalyst and a sacrificial substance,
(5) the catalyst, a sensitizer, and a sacrificial substance,
(6) the catalyst, a sensitizer, an electronic relay, and a sacrificial substance.

Always in the case of the photodecomposition of water, one may use, with the uncolored catalysts, the following systems:
(1) the catalyst alone, with ultraviolet light, as already mentioned,
(2) the catalyst and a sensitizer, with visible light, as already mentioned,
(3) the catalyst, a sensitizer, and an electronic relay, with visible light,
(4) the catalyst and a sacrificial substance, with ultraviolet light,
(5) the catalyst, a sensitizer, and a sacrificial substance, with visible light,
(6) the catalyst, a sensitizer, an electronic relay, and a sacrificial substance, with visible light.

As sensitizers one may use, for example, ruthenium trisbipyridyl or rhodamine B.

As electronic relay one may employ, for example, methylviologen (N,N'-dimethyldipyridine).

As sacrificial substances for the oxidation semireaction, one may use for example EDTA (ethylenediamine-tetraacetic acid) or saccharose.

The concentration of the sensitizer in the aqueous dispersion ranges for example from 1 to $2.10^{-4}$ mole/- liter, in the case of ruthenium trisbipyridyl. The concentration of the electronic relay is, for example, equal to $5.10^{-3}$ mole/liter in the case of methylviologen. The concentration of the sacrificial substance is, for example, 0.1 mole/liter.

The reduction and oxidation catalysts existing on the surface of the semiconductor particles are supposed to be in the form of sites which cover only a portion of the surface of the particles. The semiconductors are prepared according to known methods, taking care to select procedures which are capable of insuring the obtainment of the compound in a sufficiently subdivided form. In the case of doped semiconductors, the doping agent, for example, may be introduced during the preparation step of the semiconductor starting from the reagents thereof, so that it may be uniformly incorporated into the mass of the individual semiconductor particles. The doping agent may be also added during a subsequent calcining step.

The oxidation catalyst is then applied to the surface of the semiconductor particles by means of conventional reactions for preparing the relevant compounds, and operating with such procedures as to insure obtaining the compound in a finely divided form. To apply the reduction catalyst onto the semiconductor surface, the same criteria are followed. One method of applying the reduction catalyst consists in preparing a very finely divided dispersion of the catalyst in water and bringing such aqueous dispersion into contact, under stirring, with the semiconductor particles coated with the oxidation catalyst. Another method of applying the reduction catalyst consists in reducing one of its water-soluble compounds in the presence of an aqueous dispersion of semiconductor particles coated with the oxidation catalyst.

The following examples are given in order still better to illustrate the inventive concept of the present invention, but without limiting same.

EXAMPLE 1

(This example relates to the preparation of a catalyst consisting of In-doped CdS containing on its surface $RuO_2$ and Pt, as well as to the utilization thereof in the photodecomposition of water.)

92.7 g of $CdSO_4$ were dissolved in distilled water and additioned with 1 g of $In(NO_3)_3.5H_2O$. To the resulting solution maintained at a constant temperature of 60° C., an aqueous solution of $Na_2S$ was added while maintaining the pH at a constant value of 3.8 by addition of an aqueous solution of $H_2SO_4$. At the conclusion of the precipitation, further $Na_2S$ was added until the pH value was brought to 6. The product was then aged for 30 minutes, always at a temperature of 60° C.

The product was filtered, washed with $H_2O$, and successively with ethanol, and then it was dried under vacuum at a temperature of 40° C.

A portion of the resulting product was calcined in a closed pipe at 400° C. for 2 hours in the presence of S, to promote the doping of CdS with InS.

1 g of this product was dispersed by means of ultrasound vibrations in distilled water. 1 ml of a solution of 0.2 g of $RuCl_3$ in 100 ml of $H_2O$ was added to the dispersion. It was observed that the dispersion was flocculated and that the overlying substance was colorless.

The resulting product was dried overnight under vacuum (about 200 mm of Hg) in a slight air flow, at a temperature of 100° C.

The CdS particles containing $RuO_2$ on their surfaces (0.1% by weight) were dispersed once again in $H_2O$, at a concentration of 500 mg of CdS-In/liter.

An ultrafine Pt sol (having particle sizes of about 30 Å) was added to the dispersion in such amount as to have a Pt/CdS weight ratio equal to 1/12.5, thereby bringing about the adsorption of the Pt particles on the CdS-In particles.

The dispersion was brought to a pH=4.7 with an acetic acid-sodium acetate mixture and was then additioned with EDTA (used as a sacrificial compound) at a concentration of 0.1 mole/liter.

The dispersion was introduced into a flask having two optically flat faces and, after stripping with $N_2$, it was illuminated by means of a 450 W xenon lamp.

From the spectrum of the radiations emitted by the lamp, the infrared radiations were eliminated by means of a 15-cm cell filled with $H_2O$, and the ultraviolet radiations by means of a conventional intercepting filter which eliminated the radiations below 400 nm.

The system so arranged and operated produced hydrogen at a rate of about 70 ml/h/l of solution.

EXAMPLE 2

(This example relates to the preparation of a catalyst consisting of CdS containing $RuO_2$ and Pt on its surface, and to the use thereof in the photodecomposition of $H_2S$.)

92.7 g of $CdSO_4$ were dissolved in distilled water at a pH=3.8. To the resulting solution, kept at a constant temperature of 60° C., an aqueous solution of $Na_2S$ was added, while maintaining the pH value constantly at 3.8 by addition of an aqueous solution of sulphuric acid.

On completion of the precipitation, $Na_2S$ in excess was added till a pH=6 was attained; the product was then aged 30 minutes at a temperature of 60° C. The product was filtered and washed with water and then with ethanol and was dried under vacuum at a temperature of about 40° C.

The resulting product was calcined in a muffle furnace, in air, at a temperature of 550° C. for 15 minutes.

After cooling, 1 g of the sample was dispersed in $H_2O$ by means of ultrasound vibrations and was additioned with 1 ml of a $RuCl_3$ solution (0.2 g in 100 ml) and dried overnight at 100° C. under vacuum (about 200 mm of Hg, with a slight air flow).

The product was further calcined in a furnace at about 300° C. for 1 hour. It was then dispersed in distilled water at a concentration of 500 mg/l and was additioned with colloidal Pt (about 30 Å) in a weight ratio Pt/CdS=1:12.5.

The resulting dispersion was brought to a pH=14 by means of NaOH and was additioned with $Na_2S$ until a concentration of 0.1 mole/l was reached. It was then illuminated by the visible fraction of the radiation emitted by a 450 W xenon lamp.

In this case, the photodecomposition reaction of $H_2S$ occurred in the solution, with generation of hydrogen at a rate of 200 ml/h/l of solution and polysulphide ions.

The presence of polysulphide was revealed as follows: the catalyst was filtered and the solution was acidified; colloidal S was generated by the decomposition of the polysulphide.

EXAMPLE 3

(This example relates to the preparation of a catalyst consisting of $TiO_2$ doped with Cr and Nb, and containing $RuO_2$ and Pt on its surface, as well as to the use thereof in the photodecomposition of water.)

A sulphuric solution of $TiOSO_4$ and $Fe^{2+}$ containing 0.15% of Nb calculated as $Nb_2O_5$ on $TiO_2$ (coming from the sulphuric acid digestion of ilmenite) was hydrolyzed by heating to 95°–100° C. and dilution with $H_2O$ in a ratio of 20 parts by volume of water to 80 parts of sulphuric solution. The metatitanic acid slurry so obtained was filtered and washed in order to remove the soluble impurities.

Metatitanic acid containing 300 g of $TiO_2$ was additioned with an aqueous solution containing 0.42 g of potassium bichromate and was then calcined in a laboratory rotary furnace, whereby it was brought from room temperature to 750° C. in 4 hours.

The resulting product containing 0.05% of chromium exhibited a pale yellow shade, as the Cr ions had generated color centers in the $TiO_2$ crystals. This product, when acting as a carrier for the $RuO_2$ and Pt redox catalysts, is capable of decomposing water by radiation with visible light. In fact, a dispersion containing 500 mg/l of the product described in this example, treated with 0.1% of $RuO_2$ and in the presence of 40 mg/l of a Pt sol, generated, at a pH=4.7, hydrogen at an approximate rate of 1 ml/h/l of solution in the absence of sensitizers.

EXAMPLE 4

(This example relates to the preparation of a catalyst consisting of $SrTiO_3$ containing $RuO_2$ and Pt on its surface, as well as to the use thereof in the photodecomposition of water.)

To a metatitanic acid slurry prepared as described in Example 3, and containing about 300 g of $TiO_2$, there was admixed solid $SrCO_3$ in an equimolecular amount in respect of the $TiO_2$.

The slurry was then calcined in a laboratory rotary furnace by bringing it from room temperature to 1,150° C. in 9 hours. The resulting product, analyzed by X-ray diffraction, was shown to be composed essentially of $SrTiO_3$, containing a very low percentage of rutile $TiO_2$ and traces of anatase $TiO_2$.

The strontium titanate so obtained, consisting of particles with sizes of about 1$\mu$, was dispersed in doubly distilled water by means of ultrasound vibrations, and then additioned with a $RuCl_3$ solution containing 0.1% by weight of Ru calculated as $RuO_2$ in respect of strontium titanate.

The resulting slurry was dried overnight in an oven under vacuum (200 mm of Hg, with a slight air flow) at 100° C. A portion of the resulting product was dispersed in distilled $H_2O$ at a concentration of 500 mg/l, and then additioned with a Pt sol in such amount as to obtain a $Pt/SrTiO_3$ ratio by weight equal to 1:12.5.

After addition of a sensitizer and of an electronic relay, in the presence of the sacrificial substance EDTA, the system consisted of:

| | |
|---|---|
| $SrTiO_3/RuO_2$ | 500 mg/l |
| Pt | 40 mg/l |
| Ruthenium trisbipyridyl | $1 \cdot 10^{-4}$ mole/l |
| Methylviologen | $5 \cdot 10^{-3}$ mole/l |
| EDTA | $5 \cdot 10^{-2}$ mole/l |

The dispersion was irradiated with the visible fraction of the light emitted by a 450 W Xe lamp. By this radiation, hydrogen was generated at a rate of 160 ml/h/l of solution.

EXAMPLE 5

(This example relates to the use of a catalyst consisting of CdS containing $RuO_2$ and Pt on its surface in the photoreduction of $CO_2$.)

In the test described in Example 2, if the reaction is conducted in a $CO_2$ stream, the hydrogen yield drastically decreases down to about 80 ml/h/l of solution; the yield decrease is imputable to a reaction occurring concurrently with the evolution of hydrogen and involving $CO_2$. Actually, the gas chromatographic analysis carried out on the filtrate of the irradiated solution revealed the presence of a peak corresponding to the retention time of methanol, which is a reduction product of $CO_2$.

EXAMPLE 6

(This example relates to the preparation of a catalyst consisting of cadmium sulphoselenide containing $RuO_2$ and Pt on its surface, as well as to the utilization thereof in the photodecomosition of water.)

92.7 g of $CdSO_4$ were dissolved in distilled water until a solution at a concentration of 130 g/liter was obtained. The solution was heated to 70° C. To this solution there was added, dropwise at a rate of 100 ml every 6–7 minutes, a solution of $Na_2S$ at 75 g $Na_2S$/liter containing Se metal in an amount equal to 10% by weight calculated on the $Na_2S$. The added amount of $Na_2S$ solution was such as to cause $Cd^{++}$ to completely precipitate in the form of CdS. The precipitatate contained finely subdivided Se. An excess of $Na_2S$ solution containing Se was added in order to bring the pH value to 6–6.5. The precipitate was cooled, filtered, washed with distilled water and dried at 110° C.

The dried product was crushed in a mortar and calcined in a nitrogen atmosphere at 500° C. for 30 minutes. The product so obtained was a solid solution of formula $CdS_{0.8}Se_{0.2}$.

The product, once more ground again in a mechanical mortar, was dispersed in water and additioned with a $RuCl_3$ solution in such amount as to obtain 0.1% by weight of $RuO_2$ referred to cadmium sulphoselenide.

The resulting dispersion was evaporated to dryness at 110° C. under reduced pressure (250 mm of Hg), with a slight air flow.

Pt in an amount of 8% by weight referred to cadmium sulphoselenide was added to the product, following the procedures of Example 1.

A water dispersion of the product at 500 mg/l was irradiated as in Example 1. In this way 9 ml/h of $H_2$ per liter of dispersion were obtained.

EXAMPLE 7

A sample of $TiO_2$ doped with Cr and Nb was prepared as in Example 3, except that the amount of supported $RuO_2$ was 0.2% and the amount of Pt was 4% (calculated as % by weight on $TiO_2$).

The sample was dispersed in a solution of 6 ml of 100% acetic acid in 19 ml of water.

The irradiation of the dispersion permitted one to accomplish the photodecarboxylation reaction of acetic acid along with the photodecomposition reaction of water and with other secondary reactions, such as the complete reduction of acetic acid.

The analysis of the gas evolved by the reaction, expressed as rate of generation of the various components (in microliters per 25 ml of solution per hour) was as follows: $CH_4$: 63; $CO_2$: 24; $H_2$: 50; ethene: traces.

What is claimed is:

1. Catalysts for photo-assisted oxidation-reduction (redox) reactions, such as the photodecomposition of water, the photodecomposition of $H_2S$, the photoreduction of $CO_2$, and the photodecarboxylation of carboxylic acids, characterized in that the catalysts consist essentially of colloidal particles of a semiconductor which contain, on their surface, a reduction catalyst and an oxidation catalyst; that the semiconductor has a difference of energy between valence band and conduction band such as to permit the hole-electron separation by absorption of visible light; and that the conduction electron has such a reducing potential and the hole in the valence band has such an oxidizing potential as to allow, in the presence of the aforesaid reduction and oxidation catalysts, the accomplishment of the redox reaction; and wherein the semiconductor is selected from the group consisting of $TiO_2$ doped with Mn, Cr, or Cr and Nb; CdS doped with In or Ga; $SrTiO_3$ doped with Cr or Mn; and cadmium sulphoselenide, said reduction catalyst being selected from the group consisting of platinum, iridium, palladium, rhodium, osmium, silver and gold, and said oxidation catalyst being selected from the group consisting of oxides of ruthenium, platinum, iridium, manganese, iron, cobalt and tantalum.

2. The catalysts according to claim 1, characterized in that the reduction catalyst consists of platinum.

3. The catalysts according to claim 1, characterized in that the oxidation catalyst is ruthenium dioxide.

4. The catalysts according to claim 1, characterized in that the size of the semiconductor particles ranges from 50 Å to 10$\mu$.

5. The catalysts according to claim 1, characterized in that the size of the semiconductor particles ranges from 100 Å to 2$\mu$.

6. The catalysts according to claim 1, characterized in that the amount of reduction catalyst, referred to the semiconductor, ranges from 0.5 to 30% by weight.

7. The catalysts according to claim 6, characterized in that the amount of reduction catalyst, referred to the semiconductor, ranges from 1 to 15%.

8. The catalysts according to claim 1, characterized in that the amount of oxidation catalyst, referred to the semiconductor, ranges from 0.005 to 10% by weight.

9. The catalysts according to claim 8, characterized in that the amount of oxidation catalyst, referred to the semiconductor, ranges from 0.1 to 2%.

10. Catalysts for photo-assisted redox reactions, such as the photodecomposition of water, the photodecomposition of $H_2S$, the photoreduction of $CO_2$, and the photodecarboxylation of carboxylic acids, characterized in that the catalysts consist essentially of colloidal particles of a semiconductor containing on their surface a reduction catalyst and an oxidation catalyst; that the semiconductor has an energy difference between the valence band and the conduction band such as not to permit the hole-electron separation by absorption of visible light; that the semiconductor has such a conduction band that, after having received one or more electrons from a sensitizer excited by absorption of visible light, said electron or electrons has or have such a reducing potential as to promote the reduction semi-reaction in the presence of the reduction catalyst, while the oxidized sensitizer promotes the oxidation semireaction in the presence of the oxidation catalyst; and wherein the semiconductor is $Nb_2O_5$, said reduction catalyst being selected from the group consisting of platinum, iridium, palladium, rhodium, osmium, silver and gold, and said oxidation catalyst being selected from the group consisting of oxides of ruthenium, platinum, iridium, manganese, iron, cobalt and tantalum.

11. The catalysts according to claim 10, characterized in that the reduction catalyst consists of platinum.

12. The catalysts according to claim 10, characterized in that the oxidation catalyst is ruthenium dioxide.

13. The catalysts according to claim 10, characterized in that the size of the semiconductor particles ranges from 50 Å to 10$\mu$.

14. The catalysts according to claim 10, characterized in that the size of the semiconductor particles ranges from 100 Å to 2$\mu$.

15. The catalysts according to claim 10, characterized in that the reduction catalyst amount, referred to the semiconductor, ranges from 0.5 to 30% by weight.

16. The catalysts according to claim 15, characterized in that the amount of reduction catalyst, referred to the semiconductor, ranges from 1 to 15%.

17. The catalysts according to claim 10, characterized in that the amount of oxidation catalyst, referred to the semiconductor, ranges from 0.005 to 10% by weight.

18. The catalysts according to claim 17, characterized in that the amount of oxidation catalyst, referred to the semiconductor, ranges from 0.1 to 2%.

* * * * *